INVENTORS
CLARENCE A. BUTLER
DOMINIC R. LAZZARO
BY Jean, Fetzer & Jean
ATTORNEYS 3,510,005
NON-WOVEN TWISTED STRAND FILTER FABRIC
Clarence A. Butler, Cleveland, and Dominic R. Lazzaro, Euclid, Ohio, assignors to The Lindsay Wire Weaving Company, a corporation of Ohio
Filed Mar. 22, 1965, Ser. No. 441,569
Int. Cl. B01d 33/04, 39/08, 39/16
U.S. Cl. 210—400                              11 Claims

ABSTRACT OF THE DISCLOSURE

A non-woven porous fabric and/or endless belt for use as a fluid filter media comprising a plurality of polymeric twisted strands disposed in engaged side-by-side relation. The strands being joined together at their respective spaced points of contact by a plurality of longitudinally extending absorbent fibrous elements containing an adhesive material which is adapted to be exuded therefrom for bonding the strands together at their points of contact to provide a unitary structure.

---

This invention relates in general to filtering media, and more particularly to non-woven filtering media made of twisted strands.

In general, the present invention relates to an improved filtering media in the form of a non-woven porous structure comprised of a plurality of twisted strands made from polymeric material, such as plastic or the like, for general use as a filter and/or separation media, and for more specific uses as endless belts, cylinder covers or the like for paper making machines.

Heretofore, considerable effort has been directed to the theory of "flow" through a porous structure. The greatest effort in this area has been with reference to beds of granular particles which are either consolidated or unconsolidated. Concepts which are most generally accepted for the flow of fluids through this type of porous bed are generally based on the Kozeny-Carman equations which relate the pressure gradient of a fluid of given density, viscosity, and superficial (approach) velocity to the porosity and specific surface of a bed of granular, non-consolidated particles. To provide a more lucid understanding of these and the succeeding principles of the present invention, the following definition of terms is given:

The term "porosity" is the ratio of the volume of the voids in the structure to the volume of the structure as a whole (voids plus solid material).

The term "specific surface" is the amount of surface which can be wetted by a liquid passing through a unit volume of the structure. The surface and volume must be expressed in the same system of units, that is, square inches of surface per cubic inch of volume, or square centimeters per cubic centimeter of volume, etc.

The term "hydraulic radius" is the ratio of specific voids (porosity) to specific surface.

The term "tortuosity" represents the deviation of the length and organization of the network of pores in an actual porous structure, from the theoretical arrangement and length of pores in a structure of like size consisting of a bed of uniform, granular, non-consolidated particles.

The term "permeability" is the property of a porous structure to pass a fluid (gas or liquid) of known density and viscosity. The permeability coefficient is a property of the porous structure only, corrections having been made for fluid density and viscosity and pressure gradient producing a measured flow through a unit cross-sectional area of the structure. This coefficient has the same dimensions used to designate area in the system of measurements used.

From application of the foregoing equations, it has been found that the permeability coefficient is a property of a given porous media only, and is proportional to the product of the porosity and the square of the hydraulic radius. As the hydraulic radius for a porous body is the ratio of the porosity to the specific surface, the aforementioned relationship can be stated that the permeability coefficient is proportional to the cube of the porosity divided by the square of the specific surface. Because these relationships are proportionalities, the proportionality coefficient must be included when dealing with absolute values. For purposes of this invention, the proportional relationship will be utilized, as indicated hereinafter.

In the past, the limitations of these relationships have often been overlooked. As an example, the porosity in unconsolidated beds of solid particles of known density may be calculated readily from the apparent density of the porous bed. In consolidated bodies, however, of materials, such as porous ceramics, porous carbon; or natural materials, such as sandstone, there are many difficulties present in asserting absolute values for porosity. In such cases, distinctions must be drawn between pores that are open, semi-closed, and closed, and between the microporosity contributed by the porous nature of the particles themselves and the macro-porosity of the interstitial space around the particles. Moreover, it has been found that the absolute values for porosity are frequently in doubt and in some instances immeasurable.

In addition to porosity, another important property of a porous bed in determining the permeability coefficient is the specific surface. It has been found, that the internal surface of micro-porous particles contributes little or nothing to the resistance of fluid flow, as compared with the external surface of the particles. Even in beds of irregular but non-porous granules the external surfaces sometimes meet and these surfaces are "blind" to the flow of fluid. The total surface of a porous bed may also be in doubt and is also in some cases immeasurable. Moreover, since the hydraulic radius, as aforementioned, is the ratio of the porosity to the specific surface, it is also subject to the same sources of error as porosity and specific surface when considered independently.

In structures consisting of woven or non-woven webs of natural or synthetic fibers where the individual yarns comprised of multiple fibers the problems aforementioned have also been found to be present. Such problems have also been found to be present in varying degree in non-woven webs made from random elements, but are not present to any significant extent in webs made from woven solid mono-filaments. In the latter case, however, the problem resides in the fact that the aforementioned relationships are so rigid that it is extremely difficult to provide simultaneously the proper relationship between porosity, specific surface and structural strength of the web.

In addition to but entirely independent of the question of the absolute values for porosity and specific surface, is that of the organization of the network of pores, which will control the effective velocity of the fluid in the pores and the effective length of the path of a parcel of fluid passing through the structure. For purposes of the present invention, these factors will be considered together under the general term "tortuosity." It has been found that in a woven web of solid mono-filaments there is present only a minor amount of tortuosity.

In application of these principles to the present invention, a conventional woven web, such as a conventional woven metal belt for paper making, may first be considered. In this case, a loosely woven wire belt will exhibit a high porosity, low specific surface, and therefore a high permeability coefficient. More particularly, however, if the belt is woven with a full twill weave, the loosely woven wire will be too "sleazy" for practical application. In order to achieve the required structural characteristics in the belt, the wire may be woven more tightly, but this has heretofore resulted in a decrease of porosity, and an increase in the specific surface, thereby decreasing the permeability coefficient of the belt. Accordingly, by making the belt more rugged by using larger individual warp and shute wires, there has resulted increased physical strength up to a point where the warp wire becomes so large that the structure fails due to flexure in operation. Furthermore, it has been found that the use of larger wire will also decrease the permeability coefficient, but usually to a lesser extent as compared to tight weaving.

In structures consisting of non-woven strands, and particularly those composed of twisted strands of polymeric materials, such as plastic, considerable difficulty has been experienced in bonding adjacent strands together to form a composite structure and in a manner to achieve the aforementioned hydraulic characteristics, without reduction in the strength and flexibility characteristics of the structure. Heretofore, it has been known that the attachment of one strand to another may be achieved by thermofusion techniques or by the use of solvent-cementing. The thermo-fusion techniques may be accomplished by direct application of heat through heated platens, rollers, or by generating the heat within the strands themselves, as by high frequency induction heating. However, it has been found that thermo-fusion is unsatisfactory because of the difficulty in applying heat directly to the points of contact between adjacent strands, and because of the reduction in flexibility of the strands resulting from the heat effects.

It has similarly been found that conventional solvent-cementing is unsatisfactory due to the difficulty of application in bonding the strands together, and due to the deleterious effect upon the hydraulic and strength characteristics of the strands themselves. In application to twisted strands, it has been found impractical to use conventional solvent-cementing due to the inability to prevent rotation between adjacent strands during bonding. Moreover, even slight rotation results in the absence of sealing at the points of contact resulting in "splits" in the finished porous structure. On the other hand, the existence of excess cement at the points of contact results in the formation of thick coating so as to produce random areas of reduced and non-uniform porosity.

Furthermore, in application to polymeric strands, such as those comprised of plastic material, it has been found that if sufficient solvent is placed on the strand, such as by dipping or spraying, the deleterious effect from the chemical attack results in a reduction of the flexibility characteristics of the porous structure to a prohibitive degree. In some instances, it has been found that the entire strand dissolved to the point of breaking during manufacture of the porous structure.

Therefore, an object of the present invention is to provide a porous structure having improved strength and hydraulic characteristics for use as a filter media or the like.

Another object of the present invention is to provide a porous structure of the character described, comprised of a plurality of polymeric twisted strands, which incorporates optimum permeability characteristics by effective and selective control of the porosity, specific surface, and tortuosity of the structure without impairment to the structural strength characteristics thereof.

A further object of the present invention is to provide a porous structure of the character described comprised of a plurality of non-circular polymeric twisted strands, which are bonded together in a manner to provide optimum strength characteristics in the structure independent of and without impairment to the hydraulic characteristics thereof.

Another object of the present invention is to provide a porous structure of the character described which is of a light weight and economical construction for general use as a filter media or for more specific use in making endless belts, cylinder covers or the like for use with paper making machines.

A still further object of the present invention is to provide an endless belt made from the porous structure of the character described which incorporates improved strength, wear, corrosion and particularly good hydraulic characteristics for use in paper making machines.

Other and further objects of the present invention will be apparent from the following description and claims illustrated in the accompanying drawings, which, by way of illustration, show preferred embodiments of the present invention and the principles thereof and what is now considered to be the best mode in which to apply these principles. Other embodiments of the invention embodying the same or equivalent principles may be applied by those skilled in the art and structural changes may be made as desired without departing from the scope of the present invention.

Generally, and to the accomplishment of the foregoing objects and advantages, the present invention contemplates the provision of a porous structure comprised of a plurality of polymeric strands which are each twisted a predetermined number of turns per unit of length in a generally circular direction. The strands being of a predetermined transverse dimension and having a generally non-circular shape are disposed in contiguous side-by-side relationship to provide spaced points of contact therebetween. An elongated absorbent element containing a predetermined amount of adhesive material is disposed longitudinally intermediate adjacent of the strands and in overlying relationship relative to the points of contact therebetween. Upon application of pressure thereto, a predetermined amount of the adhesive material contained within the absorbent elements is exuded or released therefrom and deposited at the spaced points of contact, thereby to bond the elements together into a unitary, porous structure. Moreover, by a relative correlation between the construction and arrangement of the individual twisted strands and the mode of bonding the strands together, there is achieved optimum hydraulic characteristics in the porous structure without impairment to its strength characteristics. Furthermore, by this relative correlation, there is provided the optimum desired permeability characteristics in the porous structure resulting from an effective and selective control of the porosity, specific surface and tortuosity in the structure.

Figure 1:
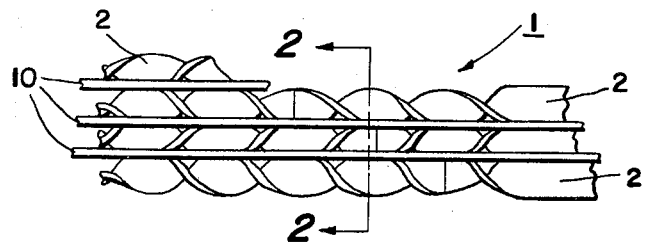
FIG. 1 is a fragmentary top plan view showing one form of the non-woven porous structure made in accordance with the present invention.
Figure 2:
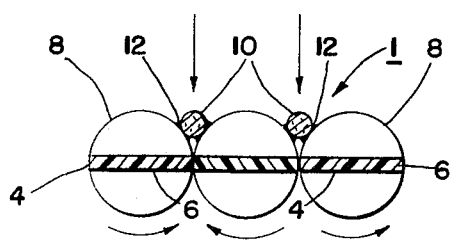
FIG. 2 is an enlarged vertical section view taken along the plane of line 2—2 of FIG. 1.

Referring then again to the drawings and in particular to FIGS. 1 and 2 thereof, there is illustrated one embodiment of the porous structure of the invention, designated generally at 1. As shown, the structure of 1 includes a plurality of twisted, mono-filaments or strands 2 comprised of polymeric material, such as plastic or the like. The strands 2 are disposed in a generally common plane and are attached together in substantially parallel, side-by-side relationship to provide a non-woven, single layer, porous structure.

Prior to being attached together, the individual strands 2 are each twisted about their longitudinal central axis a predetermined number of turns for a given unit length in either a clockwise or counter-clockwise direction. As best illustrated in FIG. 2, it is preferred that certain strands in the layer be twisted in one direction while selective of the other strands are twisted in the opposite direction. By this arrangement, adjacent strands are twisted in the opposite direction relative to one another while alternate strands are twisted in the same direction relative to one another across the transverse width of the structure, as shown by the arrows.

In this embodiment, the shape of the individual strands 2 prior to twisting is generally that of a flat ribbon-like configuration in cross-direction. Moreover, and as best illustrated in FIG. 2, each strand, in effect, includes a pair of oppositely disposed splines 4 and 6 which extend radially outwardly to the outer peripheral edge 8 of the strand. The amount of twisting and the particular shape of the strands may vary in each case to achieve the necessary structural and hydraulic characteristics for a given application, as will hereinafter be more fully described.

In accordance with the present invention, any polymeric material which may be readily formed and twisted into the desired strand configuration may be used for making the strands of the porous structure. It has been found, however, that some thermoplastic materials are particularly suitable for making such porous structure, particularly when utilized in making endless belts for paper making machines. Such thermoplastic materials may include cellulose nitrate, cellulose acetate, cellulose acetate-butyrate, polystyrene, polyethylene, polycarbonate, polypropylene, linear polyethylene, polyvinyl chloride, vinyl esters, vinylidene chloride, styrene acrylonitrile, styrene butadiene, polytetrafluoroethylene, polychlorotrifluoroethylene, acrylonitrile resin rubber, nylon, methyl methacrylate, ethyl cellulose and the like.

Preferred among the above-mentioned thermoplastic materials are polycarbonate and nylon which have the property that when expanded under the proper temperature conditions, the molecular chains, of which the plastic is comprised, become oriented in the direction of expanding, thus greatly increasing the strength characteristics of the material. Furthermore, it has been found that the structural orientation of such material, such as by twisting, is retained so that the material does not return to its original shape prior to twisting thereof.

Figure 5:
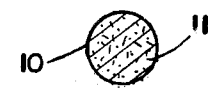
FIG. 5 is an enlarged section view of one of the absorbent elements used in making the porous structure of FIGS. 1 and 4, and showing the element saturated with an adhesive material in accordance with the present invention.

In accordance with the present invention, the porous structure 1 is achieved by bonding adjacent of the individual twisted strands 2 together by the use of absorbent elements 10 disposed to extend longitudinally between adjacent pairs of the twisted strands. Preferably, the absorbent elements 10 have a substantially reduced transverse dimension compared to the transverse dimension of the twisted strands and are preferably comprised of an absorbent material, such as soft unmercerized cotton thread or the like. The absorbent elements 10 are saturated with a liquidous adhesive 11 (FIG. 5), such as solvent-cement, which is held mechanically within the interstices of the material.

In application, the absorbent elements 10 which contain a predetermined amount of adhesive material are disposed to extend longitudinally between adjacent of the twisted strands 2, as shown in FIG. 1. Thus positioned, a slight pressure may then be applied to the absorbent elements, as shown by the arrows. This pressure somewhat deforms the absorbent elements 10 at the areas of contact between adjacent of the twisted strands 2. Such deformation automatically causes the release and deposit of a sufficient amount of the adhesive, as at 12, at the points of contact between the twisted strands to provide a positive bonding of the twisted strands 2.

In many cases, the pressure required to release the cement from the absorbent strands is produced merely by applying tension to these strands; though proper use of rollers or other devices to increase this pressure is sometimes beneficial. But it is extremely important that the strands 2 and the strands 10 be held immovable with respect to each other until the solvent has evaporated to a sufficient extent to form a bond between these strands. It is also imperative that no flexure take place during this time. The rate of evaporation can be conveniently increased by application of heat, such as by assembling the porous structure on a heated drum. This drum may be grooved to help hold the strands in the proper position to each other while the cement is setting. Any temperature between the room temperature and 200° F. may be used with a solvent-cement, such as polycarbonate dissolved in methylene chloride, with the preferred temperature being about 140° F.

In some cases, further control of the absorbency of the adhesive material by the elements 10 may be achieved by providing the surface of the elements with a pre-treatment prior to application of the adhesive material. In such case, the elements 10 may be pre-treated, such as by dipping or by spraying, with an adhesive material to control the porosity of these elements. The adhesive material may be a type, such as solvent-cement, similar to that used to saturate the interior of the absorbent elements just before the assembly of the porous structure. In certain cases, it has been found that in the absence of such pre-treatment, too great an amount of adhesive was enabled to permeate the absorbent elements 10 immediately prior to assembly with the result that an excessive amount of adhesive was released upon deformation which resulted in partial stoppage in the openings of the structure. On the other hand, it was found in some instances, that too heavy a pre-treatment prevented adequate permeation of adhesive interiorly of the elements during assembly of the structure. This resulted in unreliable bonding of the twisted strands 2.

Figure 3:
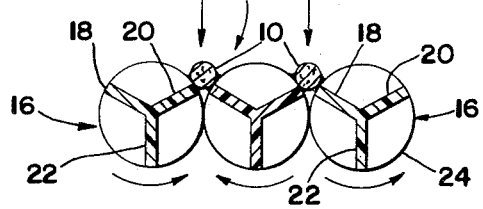
FIG. 3 is an enlarged vertical section view showing a modification of the porous structure made in accordance with the present invention.

In FIG. 3 there is shown a modification of the porous structure, designated generally at 14, which is generally similar in arrangement to that illustrated in FIGS. 1 and 2, except that the individual twisted strands 16 are of a different shape in cross-section. In this form, the individual twisted strands each include three equi-spaced splines 18, 20 and 22 which extend radially to the outer peripheral edge 24 of the strand.

Figure 4:
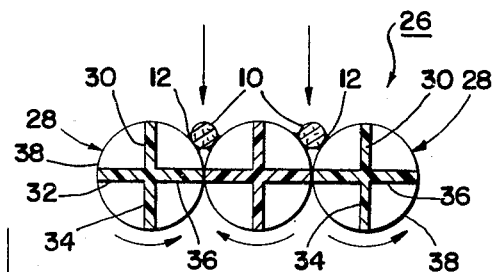
FIG. 4 is an enlarged vertical section view showing another modification of the porous structure made in accordance with the present invention.

In FIG. 4 there is shown another modification of the porous structure, designated generally at 26, wherein each twisted strand 28 includes equi-spaced splines 30, 32, 34 and 36 which extend radially to the outer peripheral edge 38 of the strand. Accordingly, though the one to four spline shapes of the strands have been illustrated, it is to be recognized that other numbers of splines or other non-circular shapes for the strands may be utilized in accordance with the present invention.

Figure 6:
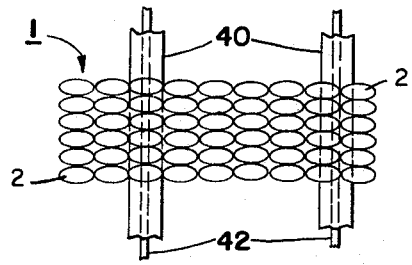
FIG. 6 is a fragmentary diagrammatic illustration and showing generally the porous structure of FIG. 1 supported by a plurality of reinforcing strands in accordance with the present invention.
Figure 7:
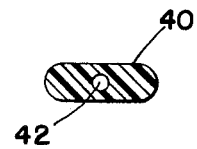
FIG. 7 is an enlarged section view showing one form of the reinforcing strand utilized in FIG. 5 and made in accordance with the present invention.
Figure 8:
FIG. 8 is an enlarged section view showing a modification of the reinforcing strand made in accordance with the present invention.

In FIGS. 6 to 8 there is illustrated another modification of the invention wherein carrying strands 40 may be utilized as a reinforcement for supporting the twisted strands 2 in the porous structure of FIG. 1, for example. Such application may be desirable in cases where the individual twisted strands 2 of the porous structure do not have sufficient strength to perform the necessary mechanical functions for sufficient life and durability.

The carrying strands 40 are preferably of an on-twisted construction, but may be comprised of similar polymeric materials, such as polycarbonate and nylon, as those employed in making the twisted strands 2. The carrying strands may further be provided with an additional reinforcement, such as with metalic wire, glass strands or the like, shown generally at 42 of FIG. 7; or they may be impregnated with a similar material 44, such as glass flakes or the like, shown in FIG. 7.

It has also been found that excellent results may be achieved by the use of carrying strands which are comprised of an absorbent material, such as those utilized in FIGS. 1 to 5, which has been suitably reinforced. The reinforcement may be accomplished by immersing the carrying strands in a solvent-cement, such as polycarbonate dissolved in methylene chloride. Moreover, in application the carrying strand may be attached to the underside and transversely relative to the twisted strands 2, as shown in FIG. 6. Here again, application of pressure to the carrying strands causes the release of a sufficient amount of the cement and at the points of contact between the twisted strands 2 to form a unitary bond, as aforesaid. In this case, it has been found that upon evaporation of the solvent, the cement, such as polycarbonate, is deposited in the interior surface of the carrying strand which results in a greatly increased wear-resistance during use of the porous structure.

In further consideration of the foregoing embodiments and with reference to Table A, it will be seen that several important variables relating to the structural characteristics of the individual twisted strands and the mode of bonding the strands together effect the hydraulic characteristics of the porous structure, and particularly the extent of independence of such variables in relation to the relative permeability in the structure for a given application, such as in the production of a Fourdrinier belt for paper making machines. In Table A, this relative permeability is expressed in relationship to the air and water permeability of a Lindsay Wire Weaving Company 74/58 PBLC Fourdrinier Wire Cloth. The functional effect of each variable, with the other variables held constant, is hereinafter discussed separately.

TABLE A

| Splines | Twist | Cement | Cotton | Relative permeability | |
|---|---|---|---|---|---|
| | | | | Air | Water |
| 2 | 6 | 6/100 | 60 | 0.214 | 0.944 |
| 3 | 6 | 6/100 | 60 | 0.107 | 0.926 |
| 4 | 6 | 6/100 | 60 | 0.077 | 0.840 |
| 2 | 4 | 6/100 | 60 | 0.188 | 0.944 |
| 2 | 6 | 6/100 | 60 | 0.214 | 9.926 |
| 2 | 12 | 6/100 | 60 | 0.154 | 0.926 |
| 3 | 6 | 6/100 | 60 | 0.107 | 0.926 |
| 3 | 12 | 6/100 | 60 | 0.093 | 0.926 |
| 2 | 4 | 4/100 | 90 | 0.214 | 0.935 |
| 2 | 4 | 6/100 | 90 | 0.231 | 0.944 |
| 2 | 4 | 8/100 | 90 | 0.231 | 0.935 |
| 2 | 4 | 10/100 | 90 | 0.231 | 0.926 |
| 2 | 4 | 12/100 | 90 | 0.231 | 0.926 |
| 2 | 4 | 8/100 | 40 | 0.200 | 0.926 |
| 2 | 4 | 8/100 | 60 | 0.200 | 0.935 |
| 2 | 4 | 8/100 | 90 | 0.214 | 0.935 |
| 2 | 4 | 10/100 | 40 | 0.188 | 0.926 |
| 2 | 4 | 10/100 | 60 | 0.200 | 0.926 |
| 2 | 4 | 10/100 | 90 | 0.231 | 0.926 |
| 2 | 4 | 12/100 | 40 | 0.200 | 0.900 |
| 2 | 4 | 12/100 | 60 | 0.200 | 0.909 |
| 2 | 4 | 12/100 | 90 | 0.231 | 0.926 |

In the above table, and looking from left to right, the first column is tabulated with reference to the cross-sectional shape of the twisted strands 2. In this column, the shape is given particularly with reference to the number of projections or splines on the strand, as illustrated in FIGS. 2–4. Moreover, it can be observed that the four spline 30–36 shape of FIG. 4 has less relative permeability to air and water compared to the three spline 18–22 shape of FIG. 3, while the latter shape has less relative permeability compared to the two splines 4 and 6 shape of FIG. 2. It has been found, for example, that the three and four spline shapes are not as effective as the two spline shape, such as for instance in Fourdrinier belts, due to reduced permeability and clogging. Accordingly, it has been found that the two spline or twisted ribbon-shape of FIG. 2 is preferred and provides extremely good results for this purpose. Furthermore, in the two spline shape, the relative permeability to water is only slightly less relative to the Fourdrinier woven wire while the relative permeability to air is much less than the woven wire which is particularly advantageous for paper making purposes. Thus, in the present invention, the relative permeability to both air and water may be effectively controlled by variation in the number of projections or splines provided on the individual twisted strands.

The second column is tabulated with reference to the amount of twist imparted to the strands, and more particularly, to the number of turns per inch of strand length. In this column, the strands have been given 4, 6 and 12 turns per inch of length. It can be observed that the number of turns per inch has relatively little effect on the relative permeability to water with the four turn per inch strand being the most permeable. It has been found, however, that the tortuosity is greatest with a lower number of turns than with a greater number, but as the number of turns is further increased another variable becomes important. That is, through the tortuosity is further reduced by further twisting, the twisted strands are foreshortened so that the tortuosity tends to decrease to the point wherein the reduction in permeability, due to reduction in porosity, is greater than the increase in permeability due to the decrease in the tortuosity of the passages in the porous structure. Moreover, with an infinite amount of twisting the splines would be disposed in substantially perpendicular relationship relative to the longitudinal central axis of the strands so that the passageways between adjacent of the strands would be substantially linear, as in the case of a woven, mono-filament construction.

In the third column, the tabulation is with reference to the composition of the adhesive material 11 (FIG. 5), and more particularly to the solids content of the cement in the solvent. The solids content is expressed in terms of the ratio of the amount of cement, by weight, dissolved in the solvent solution. In the embodiments illustrated, the ratios expressed are the proportions of polycarbonate dissolved in methylene chloride. Moreover, it can be observed that various ratios or concentrations of the cement dissolved in solvent may be utilized so that sufficient amounts may be released and deposited at the spaced points of contact between adjacent of the twisted strands. As shown, the composition may be in the range from about 4% to 12%, by weight, with the preferred range being about 6% to 8%, by weight, and with the preferred amount being about 6%, by weight, to provide optimum bonding of the strands without impairment to the hydraulic characteristics of the porous structure. Thus, it can be seen that with the preferred adhesive composition there is substantially no difference in relative air permeability, and a progressively slight decrease in water permeability as the concentration of the solids content of the cement is increased. Thus, while one adhesive material has been illustrated, it is to be understood that other adhesive materials which are compatible with the polymeric material of the twisted strands and which provide strong bonding of the strands without impairment to the hydraulic characteristics of the porous structure may also be utilized in accordance with the present invention.

In the last column, the tabulation is made with reference to the size or diameter of the absorbent elements 10. Looking from top to bottom in the table, it can be seen that there are three groups of twisted strands which contain 8%, 10% and 12% solvent-cements which exhibit no significant variation in permeability to water, except with No. 40 Cotton with a 12% solvent-cement. Moreover, it can generally be observed that the relative permeability to air increases as the size of the cotton decreases.

In addition to their effect upon the relative permeability, the above described variables also have an effect upon other related hydraulic characteristics of the porous structure, such as the porosity, specific surface, and tortuosity.

Generally, the porosity of the individual strands, and therefore, of the porous structure comprised of such strands, may be determined by the ratio of the area of a circle circumscribing the extremities of the projections or splines to the cross-sectional area of the solid material of which the strand is comprised, as shown in FIGS. 2–4. Moreover, it has been found that the greatest porosity would result from a twisted strand having two splines 4 and 6, as shown in FIG. 2.

In this connection, it has been found that the shape of the strand, assuming that the cross-section of the solid material in the strand is kept constant, effects specific surface, as well as porosity. Thus, a strand having a four spline shape (FIG. 4) has a greater specific surface as compared to a circular strand of the same cross-section. Moreover, the circular strand would provide a structure having substantially no porosity. Accordingly, the four spline strand shape would have a greater specific surface than the two spline shape (FIG. 2) even though the latter shape in this case would have a greater porosity compared to the shape shown in FIG. 4. Moreover, it can be seen that in general the number of projections or splines on the strand has a pronounced effect upon the specific surface of the porous structure.

As aforementioned, the tortuosity of the openings or passageways in the porous structure is controlled principally by the number of turns imparted by twisting the individual strands. Moreover, it has been found that the shape of the individual twisted filaments effects porosity to a greater extent compared to the amount the strands are twisted.

In accordance with the present invention, it has also been found that the relative direction of twist imparted to the individual strands is important, particularly as concerns the structural characteristics of the porous structure. In cases where all of the strands are twisted in the same direction, due to the action of the solvent-cement on the twisted strand, there is a tendency to untwist during the time when the strand is partially soft. This results in a finished porous structure which has a tendency to curl to a prohibitive degree. Such curling indicates the presence of undesirable stress forces in the porous structure and sometimes results in "splitting" of the structure when the material is flattened out for mounting on the reinforced carrying strands 40, as shown in FIG. 6. Thus, in the present invention, it has been found that this curling tendency is completely eliminated by twisting adjacent strands in the opposite direction relative to one another; while twisting alternate strands in the same direction relative to one another, as aforesaid. Such twisting does not impair the hydraulic characteristics of the porous structure, but provides improved structural characteristics in the finished porous structure.

Thus, while we have illustrated herein preferred embodiments of our invention, it is to be understood that changes and variations may be made by those skilled in the art without imparting from the spirit and scope thereof.

We claim:

1. A non-woven fabric structure for use as a filter media comprising, a plurality of polymeric elongated strands, said strands having a substantially uniform non-circular transverse cross-sectional shape and being twisted a predetermined number of turns in a generally circular direction about their longitudinal axes to provide voids and spaced contact points throughout their length, said strands being disposed in side-by-side relationship so as to be in longitudinal engagement with one another at said respective points of contact, at least one elongated absorbent and fibrous element disposed longitudinally between adjacent of said strands and in engagement with other spaced contact points on said strands, said absorbent element being disposed in overlying relation to said points of contact between adjacent of said strands, said absorbent elements containing an adhesive material absorbed therein and adapted to be exuded therefrom, and said adhesive material bonding said strands together at said other spaced contact points to form a unitary structure.

2. A non-woven fabric structure in accordance with claim 1, wheerin adjacent strands are twisted in the opposite direction relative to one another, while alternate strands are twisted in the same direction relative to one another.

3. A non-woven fabric structure in accordance with claim 1, wherein each of said strands comprises a plurality of radial projections, and said strands each being twisted in the range from about four to twelve turns per inch of length in a generally circular direction about their longitudinal axes.

4. A non-woven fabric structure in accordance with claim 1, wherein said elements are comprised of a fabric material.

5. A non-woven fabric structure in accordance with claim 1, wherein said adhesive material is a solvent cement.

6. A non-woven fabric structure in accordance with claim 1, wherein the cement is present in the solvent-cement in a range from about 4% to 12% by weight.

7. A non-woven fabric structure in accordance with claim 1, wherein each of said strands comprises between about two to four spline portions extending radially outwardly therefrom.

8. A non-woven fabric structure in accordance with claim 1, wherein each of said strands includes an adhesive coating material disposed on the exterior surface thereof.

9. A non-woven fabric structure in accordance with claim 1, including a plurality of reinforcing strands attached to and extending at an angle with respect to said twisted strands on the side opposite said absorbent elements to provide a reinforcement therefor.

10. A non-woven endless porous belt for use with paper making machines or the like comprising, a plurality of polymeric elongated strands, said strands having a substantially uniform non-circular transverse cross-sectional shape and being twisted a predetermined number of turns in a generally circular direction about their longitudinal axes to provide voids and spaced contact points throughout their length, said strands being disposed in side-by-side relationship so as to be in longitudinal engagement with one another at said respective points of contact, at least one elongated absorbent and fibrous element disposed longitudinally between adjacent of said strands and in engagement with other spaced contact points on said strands, said absorbent element being disposed in overlying relation to said points of contact between adjacent of said strands, said absorbent elements containing an adhesive material absorbed therein and adapted to be exuded therefrom, and said adhesive material bonding said strands together at said other spaced contact points to form a unitary structure.

11. An endless porous belt for use with paper making machines or the like comprising, a non-woven fabric structure including a plurality of polymeric elongated strands, said strands having a generally uniform non-circular transverse cross-sectional shape being comprised of a plurality of radial projections and being twisted a predetermined number of turns in a generally circular direction about their longitudinal axes to provide alternately disposed spaced voids and contact points throughout their length, said strands being disposed in side-by-side relationship having their longitudinal axes disposed in the same general plane and being in longitudinal engagement with one another at said respective points of contact, at least one elongated absorbent fibrous element disposed longitudinally along one side of said fabric between adjacent of said strands and in engagement with other spaced contact points on said strands in overlying relation to said points of contact, said absorbent elements containing an adhesive material absorbed therein and adapted to be exuded therefrom during installation on said fabric, and said adhesive material bonding said strands together at said other spaced contact points to form a unitary structure.

References Cited

UNITED STATES PATENTS

| | | | |
|---|---|---|---|
| 2,355,822 | 8/1944 | Rugeley. | |
| 2,357,392 | 9/1944 | Francis. | |
| 2,573,639 | 10/1951 | Coler | 219—500 X |
| 2,784,132 | 3/1957 | Maisel | 55—524 X |
| 2,923,653 | 2/1960 | Matlin et al. | 55—524 X |
| 2,919,217 | 12/1959 | Bobkowicz | 161—143 X |
| 3,095,283 | 6/1963 | Wheeler | 29—191.6 |
| 3,158,984 | 12/1964 | Butler | 210—400 X |
| 3,351,205 | 11/1967 | Butler et al. | 210—400 |

OTHER REFERENCES

Wrofnowski, A. C.: Chemical Engineering Process, July 1957 (vol. 53, No. 7) pp. 313–19.

REUBEN FRIEDMAN, Primary Examiner

W. S. BRADBURY, Assistant Examiner

U.S. Cl. X.R.

210—499, 504, 506